J. DAVIS.
SIGNAL LIGHT FOR VEHICLES.
APPLICATION FILED NOV. 13, 1920.
1,383,606. Patented July 5, 1921.
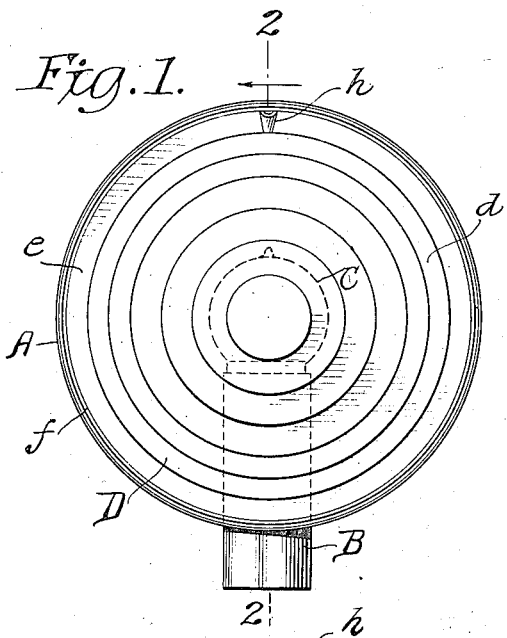
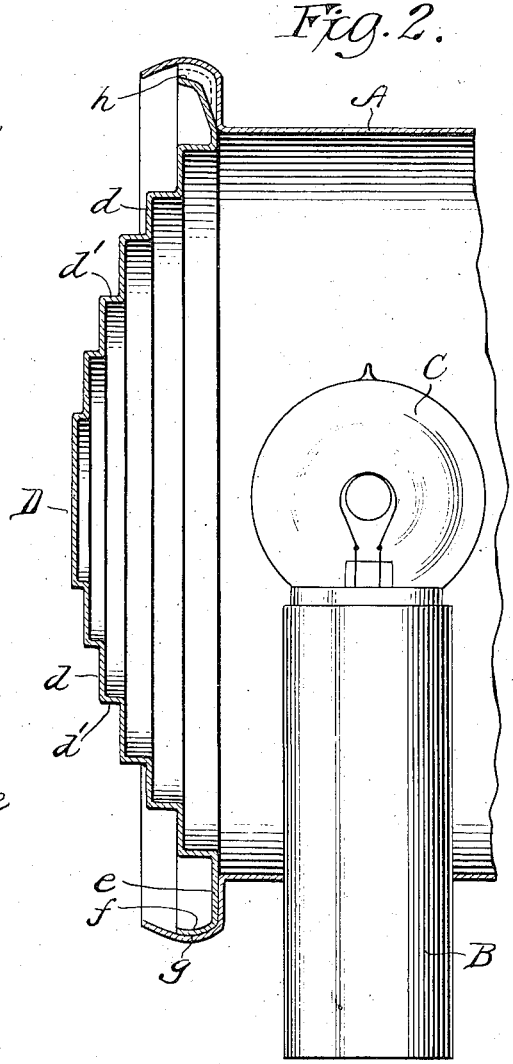
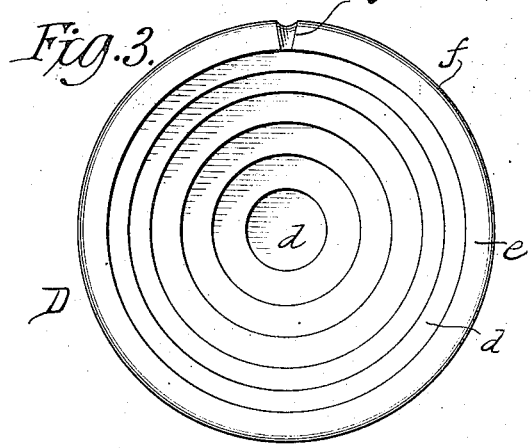
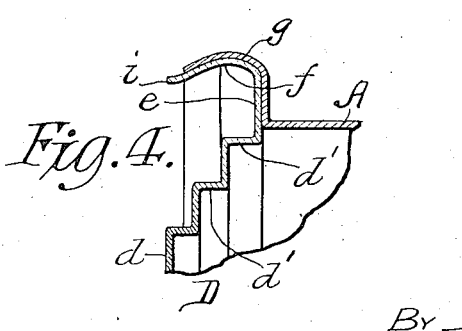
INVENTOR.
Joseph Davis
By H. S. Benshire
Attorney.

cut# UNITED STATES PATENT OFFICE.

JOSEPH DAVIS, OF NEWARK, NEW JERSEY, ASSIGNOR TO THE INSEL COMPANY, OF NEWARK, NEW JERSEY, A CORPORATION OF NEW YORK.

SIGNAL-LIGHT FOR VEHICLES.

1,383,606.  Specification of Letters Patent.  Patented July 5, 1921.

Application filed November 13, 1920. Serial No. 423,814.

*To all whom it may concern:*

Be it known that I, JOSEPH DAVIS, a citizen of the United States, residing at the city of Newark, county of Essex, and State of New Jersey, have invented a certain new and useful Signal-Light for Vehicles, of which the following is a specification.

This invention is an illuminated signal, adapted more particularly for vehicles, and it pertains especially to an improvement in the rear or so-called "tail" light for automobiles or other motor driven vehicles.

As is well known, a rear signal on a motor car is provided usually with a colored lens, composed usually of glass, retained in a fixed relation to the light housing by seating said lens in a suitable recess and by the locking action of a retainer consisting usually of a spring ring which snaps into the recess of the light housing. The lens is frequently broken, and it is difficult to remove the spring retainer and the lens, the removal of which parts is required to gain access to the interior of the light housing for cleaning and repairs.

My improvement is a cover for the opening usually provided in the lens housing for the reception of the glass lens, said cover constituting a substitute for the glass lens and the spring retainer, whereby a single element (the cover) replaces the two parts (glass lens and wire spring).

The cover is composed of flexible transparent or translucent material, such as celluloid or analogous material possessing the desirable properties of flexibility and transparency. The article is molded under heat and pressure to impart to the flexible material a desirable cross sectionally stepped construction which adds the required stiffness and stability to said material without detracting from its inherent semi-elastic property, as a result of which stepped construction the light rays from a lamp within the housing are free to pass without dispersion to any appreciable extent through the transparent or translucent ribbed material and the molded article possesses the required elasticity to spring back to its original form whereby the molded article is capable of such deformation by hand as to enable it to be inserted into the light housing and to snap into place for a desirable interlocking engagement with the light housing. The molded article retains itself in the seat provided for its reception in the light housing without resorting to the use of the spring retainer, although such retainer of a common form may be employed when desired for affording added security.

For readily dismounting the cover from the light housing, said cover is provided with means, such as a lip, whereby force may be applied for displacing the cover. Furthermore, the cover is provided with a marginal rim or flange integral with said cover, said marginal rim or flange affording a relatively broad face adapted to occupy the seat of the light housing and to coöperate therewith in retaining said cover firmly in position.

Other functions of the invention will appear from the following description taken in connection with the drawings, wherein—

Figure 1 is an elevation viewed from the rear of an illuminated signal the cover of which embodies my invention.

Fig. 2 is a vertical cross section on an enlarged scale and on the plane of the dotted line 2—2 of Fig. 1.

Fig. 3 is a detail view in elevation of the molded ribbed cover of my invention dismounted from the light housing.

Fig. 4 is a detail vertical section through a portion of the light housing and a portion of the ribbed cover, the latter being provided with a lip for pulling said cover out of the seat in the light housing.

To enable others to understand my invention it is shown in connection with the light housing A of an illuminated signal usually employed in the rear of a motor car. The light housing is carried by a short post B the upper end of which affords a socket for an ordinary incandescent lamp C, but as these parts are ordinary in the art, no further description or illustration thereof is necessary. The light housing is open at the rear for the reception usually of a glass lens and a spring retainer therefor, said lens and the spring retainer being received within an annular groove or recess *g* of said light housing.

According to my invention, the glass lens and the spring retainer are replaced by a single element, the same comprising a flexible cross sectionally stepped cover D. This cover is composed of flexible material of a character possessing the desired transparency or translucency, such material being usually celluloid, or other material of the same nature and possessing the same or similar properties. The celluloid or analogous material is molded by subjecting the same to heat and pressure, the procedure resulting in a plurality of panels *d* joined by shoulders *d'*, thereby imparting the desired cross sectionally stepped formation to the closure, and such procedure resulting also in a marginal radial flange *e* which terminates in a rim *f*, the latter being unitary with the molded cover and formed by bending or curling the material. As will be seen by reference to Figs. 2 and 4, the panels *d* of the cover are in different vertical planes, parallel one to the other, and joined by the shoulders *d'*, the cover D presenting in cross section a succession of panels in step like formation on both the exterior surface and the interior surface of the cover. The panels and shoulders of the molded cover are so formed that said cover, when seated in the light housing, offers for all practical purposes no appreciable obstruction to the passage of the rays from the lamp C; in other words, the shoulders *d'* of the cover occupy such position with reference to the panels *d* that said shoulders in no sense perform the function of means for dispersing the light rays, in which respect the cover D for the the so called "tail light" signal is differentiated from the lens or a lens cover of some of the prior head light appliances used in motor vehicles, wherein provision is made for dispersing the light rays from relatively high powered lamps in order to overcome the objectionable glare from such lamps. In my invention, the cover does not perform the functions of dispersing or of concentrating the rays from the illuminating lamp, but on the contrary such cover acts merely as a transparent, and preferably colored, closure for the light housing to protect the lamp, the reflector, if one be used, and the interior surfaces of said light housing from the accession of dust and dirt, and from the action of the weather.

As shown, the central panel of the cover is circular in form, and the remaining panels are concentric therewith; but it will be, of course, understood that the form or arrangement of the panels and their intermediate shoulders may be changed and varied, having in view the quality of permitting the free transmission of the light rays in contradistinction to the dispersion of such rays.

A distinctive feature of my non-breakable closure is that the thin flexible material is given such form as to possess the stability required to adapt it for use in a lamp housing. As is known to those skilled in the art pertaining to electric illumination as applied to motor vehicles, the lamp housings are provided with light openings of such diameters that a thin flat sheet of flexible material of the diameter suited to such light openings is not sufficiently stiff or rigid to preclude buckling or distortion under atmospheric changes or to resist wind pressure and to withstand other service conditions. To meet the requirements for a device of this character I provide a non-breakable closure composed essentially of thin flexible material, such as celluloid, to which is given a cross sectional stepped formation, characterized by a plurality of panels and intermediate shoulders all lying within a marginal rim or border, said panels and shoulders of the thin flexible material protruding on the exposed face of the closure beyond the transverse plane of the rim or border, whereas on the rear or concealed surface of the closure the panels and the shoulders follow the general contour of the bulged exposed surface; in other words, on the bulged exposed surface of the closure, the panels and shoulders are in relief, whereas on the concealed sunken surface of said closure the panels and shoulders may be said to be intaglio, as shown in Fig. 2.

The offset paneled portions comprising the body of the closure impart such stiffness to the device that it resists wind pressure and is precluded from buckling and distortion under atmospheric changes and, furthermore, retains its contour under all conditions of service, while at the same time said panels allow the free transmission of the light rays, when the closure is utilized in the lamp housing of the so-colled "tail-light," and, further, the closure is susceptible of deformation to the slight extent required in placing the same in position within the light housing.

It will be understood that the rim or border of the closure is fitted within a seat the width of which is ordinarily such as to accommodate a relatively thick and stiff glass closure and a locking ring for such stiff glass closure. The width of the closure-seat within the light housing is greater to quite a marked extent than the thickness of the thin flexible material comprising the non-breakable closure of my invention, and in one practical form of said closure the rim or border thereof is fashioned to present an edge the width from front to rear being such as to fit snugly within the seat of the light housing, said rim or flange being flexible so as to preclude displacement or loose movement and rattling of the closure, although the usual locking ring may be employed as heretofore stated.

The comparatively wide marginal rim *f* is useful as a means for affording increased stability to the relatively thin transparent material, and, furthermore, said marginal rim presents a wide surface adapted to occupy the internal recess *g* usually provided within the light housing for the reception of the colored lens. The rim *f* of my cover is of such dimensions preferably that it fills the recess in order that the cover may be interlocked with the light housing and be retained therein so firmly that it cannot rattle or shake loose under the vibration of the motor vehicle, although for added security the spring wire retainer may be used, if desired.

In order to position the cover within the light housing, it is deformed by hand so as to bend or buckle it sufficiently for its introduction into the opening provided within the light housing, and when so introduced in a deformed or buckled condition, the pressure is removed, whereupon the inherent elasticity of the flexible molded cover allows the article to spring back to its normal condition and to snap into place within the seat *g* of the light housing.

The rim *f* in my non-breakable cover performs several functions, some of which have been heretofore stated, but it is desired to call attention particularly to the fact that said rim is sufficiently flexible to give or yield for clearing the flange *g* of the light housing when introducing the closure. The rim is cross sectionally curved and it extends outwardly from the radial flange *e* of the cross sectionally stepped cover, said outward extension of the rim and the curved cross section thereof affording the required quality of flexibility so as to snap the closure into an operative position within the light housing, which operation is effected by the minimum distortion or deformation of the cover *per se*. In like manner, the outwardly curved rim *f* permits the removal of the closure when it becomes necessary to obtain access to the lamp for renewal or repairs, it being obvious that the notched flexible rim can be pressed sufficiently to clear the flanged light housing so as to dismount the closure without injury to the flexible material of which it is composed.

The cover is retained by inherent elasticity so firmly in position that it cannot be displaced by the vibration, but to renew the lamp or to cleanse the interior of the light housing, it is necessary at times to remove the cover. To allow such removal to be effected with facility I provide one or the other of the expedients shown in the drawings. In Figs. 1, 2 and 3, the cover is shown as having a notch *h* provided in the rim *f*, which notched part of the rim is free from contact with the seat *g*, see Fig. 2, thereby providing a space into which can be thrust an implement, such as a knife blade or wire, for prying the cover out of its place in the light housing. Again, the rim *f* of the cover may be provided with a tab *i* shown in Fig. 4, which tab protrudes beyond the edge of the light housing, in order that said tab may be grasped by the fingers for pulling the cover out of the seat *g* in the light housing.

Although I have shown and described my flexible cross sectionally stepped cover as adapted for use in connection with the light housing of an automobile tail light, it will be understood that the cover may be used in other relations and for other purposes, such as a cover for a light housing in a stationary railway signal, or for a light housing in a hand lantern, and for various other purposes.

Having thus fully described the invention, what I claim as new and desire to secure by Letters Patent is:

1. A new article of manufacture comprising a closure of cross sectionally stepped formation and composed of flexible light-transmitting material the surfaces of which are so related as to permit the free and unobstructed transmission of light rays through the material, said closure being susceptible of deformation for its introduction into a light housing and the material by reason of its inherent elasticity being adapted for retaining the closure in operative position relatively to said light housing.

2. A new article of manufacture comprising a closure composed of flexible light-transmitting material of stepped formation in cross section and provided with a forwardly curved marginal rim, said rim affording a contact surface the width of which exceeds the cross sectional thickness of the material composing the closure.

3. A new article of manufacture comprising a closure composed of flexible light-transmitting material provided with integral shoulders imparting to the closure a stepped formation in cross section and affording a desirable stability to the relatively thin material, said cover being provided at its margin with a forwardly extending rim having means for facilitating the removal of said cover from a light housing.

4. A new article of manufacture comprising a cover composed of flexible light-transmitting material provided with integral ribs or shoulders for imparting a desirable stability to the relatively thin material, said cover being provided with a forwardly extending marginal rim and with an element on said rim for facilitating the removal of said cover from a light housing.

5. A light-housing closure composed of relatively thin flexible light transmitting material of cross sectionally stepped formation and provided with a border or rim adapted to occupy a seat within a light housing, the body portion of said cross sectionally stepped thin flexible material resulting in a bulged contour offset with reference to the transverse plane of said rim and producing a plurality of panels and shoulders all integral with the material and imparting a desirable stiffness to said flexible material.

6. A light-housing closure composed of relatively thin flexible light transmitting material having a border or rim adapted to occupy a seat within a light housing, said flexible material being of stepped formation in cross section and producing a succession of panels and shoulders which on the exposed surface of the closure are successively offset with respect to the transverse plane of said rim or border.

7. In a device of the class described, the combination with a light housing provided with a closure-receiving seat, of a closure composed of relatively thin flexible light transmitting material and of stepped formation in cross section, said cover having a marginal portion or border the thickness of which from the front surface to the rear surface corresponds substantially to the width of the seat in said light housing, said margin or border being sprung into the seat of said light housing.

8. A new article of manufacture comprising a lamp-housing closure composed of flexible light transmitting material and of stepped formation in cross section, said cover being provided with a marginal rim extending forwardly from its junction with the body of said closure.

9. A new article of manufacture comprising a lamp-housing closure of stepped formation in cross section and composed of flexible light-transmitting material, said cover being provided with a flexible marginal rim which is curved in cross section and is spaced relatively to the stepped formation on the exterior surface of said closure.

10. A new article of manufacture comprising a light-housing closure composed of flexible light-transmitting material, and a marginal rim integral with said closure, said marginal rim being cross sectionally curved and said rim extending forwardly with respect to the plane of the closure to occupy a spaced relation to the outer surface thereof and said rim being free to flex relatively to the body portion of said closure so as to facilitate the insertion and removal of the closure as a unit.

11. As a new article of manufacture, a light-housing closure composed of relatively thin flexible light transmitting material of cross sectionally stepped formation, said stepped cross section of the flexible material producing a succession of surfaces offset with respect to the transverse plane of the marginal portion of the closure.

12. As a new article of manufacture, a light-housing closure composed of relatively thin flexible light transmitting material of cross sectionally stepped formation, the marginal portion of said closure being curled in one direction and producing a seating rim the thickness of which from the front surface to the rear surface exceeds the thickness of said thin flexible material, said stepped cross section of the flexible material producing a succession of surfaces offset with respect to the transverse plane of said curled rim.

In testimony whereof I have hereto signed my name this 12th day of November, 1920.

JOSEPH DAVIS.